United States Patent [19]

Karner

[11] 3,974,612
[45] Aug. 17, 1976

[54] STRUCTURAL ELEMENT
[76] Inventor: Karl Karner, Metzlerstrasse 39, D-6 Frankfurt am Main, Germany
[22] Filed: June 29, 1973
[21] Appl. No.: 375,186

[30] Foreign Application Priority Data
June 29, 1973  Germany............................ 2232567

[52] U.S. Cl.................................. 52/309; 52/625; 52/450; 52/454
[51] Int. Cl.² ............................................ E04B 5/46
[58] Field of Search ............ 52/309, 624, 625, 443, 52/447, 448, 449, 450, 452, 453, 454

[56] References Cited
UNITED STATES PATENTS

| 3,401,494 | 9/1968 | Anderson............................ 52/309 |
| 3,546,841 | 12/1970 | Smith et al........................ 52/624 X |
| 3,583,123 | 6/1971 | Holmgren.......................... 52/309 X |
| 3,715,846 | 2/1973 | Sullhofer............................ 52/309 |

FOREIGN PATENTS OR APPLICATIONS
584,506   10/1959   Canada................................ 52/454

Primary Examiner—Ernest R. Purser
Assistant Examiner—Carl D. Friedman
Attorney, Agent, or Firm—Lackenbach, Lilling & Siegel

[57] ABSTRACT

The invention relates to a structural element in the form of a panel of foamed plastic material provided with a ribbed metal reinforcing member at least part of which is heated to a temperature exceeding the melting point of the foamed plastic material, the reinforcing member subsequently being urged into contact with the panel and becoming welded to the panel. The ribbed reinforcing member may be of expanded metal to act as a plaster support.

15 Claims, 6 Drawing Figures

STRUCTURAL ELEMENT

This invention relates to a structural element and more particularly to a structural element comprising a panel of thermoplastic material provided with a metal member functioning as a reinforcing insert.

Panels of foamed plastic material are frequently utilized in the building industry as insulating and cladding panels. Such panels are frequently used as cores in sandwich elements or with their entire surface in contact with a rigid support member in order to avoid the foamed plastic material panels being mechanically stressed because of the low mechanical strength of such panels which is caused by the structure of the foam.

Such elements laminated with metal mesh have been developed to enable the thus reinforced elements to be used as self-supporting structural elements. A combination of foamed plastic material and metal mesh, particularly a metal mesh in the form of a ribbed, sheet of expanded metal, forming a self-supporting, rigid structural element, may be obtained, for example, by expanding foam in contact with the mesh. However, this suffers from the disadvantage that the foamed plastic material may fill the cavities or openings in the expanded metal sheet during the expansion operation and thus the expanded metal sheet may be totally embedded in the foamed plastic material. The resultant element or panel may have a predominantly smooth surface on which plaster may not adhere, or may ahere only badly. Moreover, the known process is very uneconomical because of the expense of the expansion operation which is required for every panel or every two panels, if the expansion operations for two panels are performed simultaneously.

It has also been proposed to attach metal mesh, more particularly a mesh formed from expanded metal sheet, to a panel of foamed plastic material by means of mortar or adhesive. This proposal does not relate to prefabricated structural elements but rather to the attachment of reinforcing to a preformed element, and the ribs of the expanded metal do not effectively stiffen the element becuase they are disposed above the foamed plastic material panel and only the back surface of the expanded metal engages with the panel.

It has also been proposed to utilize a foamed plastics material panel with grooves on one surface thereof that extend parallel to each other, the distance between adjacent grooves corresponding to the distance between adjacent ribs of the expanded metal sheet, the ribs of the expanded metal sheet being inserted into the said grooves and being retained therein by a bonding medium. The ribs which are inserted into the grooves effectively laminate the expanded metal and the foamed plastic material and therefore the laminated element has an adequate stiffness. Manufacture of such a structural element requires for the grooves to be milled into the surface of the panel, the preparation of a bonding medium, such as a mixture of cement, fine coarse sand and a plastic suspension with the addition of water, and the precisely metered introduction of the bonding medium through nozzles by, for example, combined agitator and delivery screws the bonding medium being fed as strands into the grooves followed by the insertion of the ribs of the expanded metal sheet into the grooves filled with bonding agent, followed by curing under pressure for at least 24 hours.

In one example of such a panel having an area of 1 square meter the weight of bonding medium amounts to approximately 0.70 kg, the weight of 1 square meter of 0.3 mm expanded metal sheet is approximately 1.05 kg and the weight of 1 square meter of foamed plastic material 3 cm thick with a density of 0.02 is 0.60 kg. Thus the total weight of 1 square meter of the laminated material is therefore 2.35 kg.

The bonding medium required for this known method increases the weight of the laminated element from 1.65 kg to 2.35 kg, the bonding medium increases the total weight of the panel by about 40%. The work involved in this kind of manufacture also poses economic limits.

Other known structural elements which are combined with expanded metal sheets or panels of hard substances with grooves for the adhesion of plastic material coverings have entirely different properties and do not relate to foamed plastic material panels with which the present invention is concerned.

It is the object of the invention to provide an improved structural element in which the disadvantages of the above described known and prior proposed structural elements with regard to their manufacture as well as with regard to their application are reduced. The invention also seeks to provide an improved structural element which can be produced with simple and low cost means, even automatically, under economical conditions, even in the large quantities per unit of time, such panels, although being of relatively low weight, being able to provide a relatively large stiffness to permit their use in building construction operations.

According to this invention there is provided a structural element comprising a foamed plastic material panel and a metal member as a reinforcing insert wherein said metal member has at least one rib or protuberance and is welded to said panel by heating at least a portion of the metal member to a temperature above the melting point of the material of the panel and by urging at least a part of the heated metal member into the panel.

According to another aspect of this invention there is provided a method of manufacturing a structural element comprising the steps of heating at least a portion of a metal member having at least one rib or protuberance to a predetermined temperature and urging the heated metal member into a panel of foamed plastic material, the predetermined temperature being above the melting point of the foamed plastic material, the metal member being welded to the said panel.

Conveniently the sheet metal member may be constructed to function as a plaster support and, for example, may be formed from expanded metal.

Advantageously, sheet metal members of V, U, trapezoidal or other cross-sectional configuration are provided in a number and/or sequence and/or disposition and/or coordination with each other to reinforce the panel.

It is known to utilize combinations of foamed plastic materials or foamed plastic materials and other materials as adhesive bonds, more particularly in building construction. Welded joints with foamed plastic materials are avoided because of the volumetric shrinkage which occurs on welds in foamed plastic materials.

There is a prevailing view among experts that foamed thermo-plastic materials cannot be combined with a reinforcing member other than by adhesive joining. In contrast to this the invention provides a welding method that is not only feasible but in fact provides advantageous results compared with the prior art.

In order that the invention may be more readily understood and so that further features thereof may be appreciated the invention will now be described by way of example with reference to the accompanying drawings in which.

Figure 1:
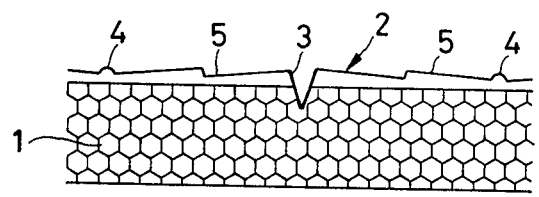
FIG. 1 is a diagrammatic cross-sectional view of one embodiment of a structural element in accordance with the invention.

Similar reference numerals are allotted to similar parts throughout the drawings. A panel 1 of foamed plastic material is provided with a sheet of metal 2 having a predetermined cross-section welded to the panel and extending to a greater or lesser depth into the panel as shown in FIGS. 1 to 5. The said sheet of metal 2 comprises an expanded metal sheet with inwardly protruding ribs 3 that extend parallel to each other and are shown only in cross-sectional form in FIGS. 1 to 5, and a zone 5 of generally herringbone cross-section with approximately centrally disposed beads or ridges 4 the herringbone zones 5 being disposed between the said beads and the ribs 3. Referring to FIG. 6 another sheet metal member 9 may be introduced under the effect of heat into the panel 1 as a reinforcing member.

A structural element in accordance with the invention is produced as follows: Thin walled sheet metal members, which are either constructed with a cross-section in the form of a trough or a rib with a V, U, trapezoidal or other cross-section, for example the sheet metal member 9 shown in FIG. 6, or which have ribs 3 as provided on the expanded metal sheet 2 utilized in the embodiments of the invention illustrated in FIGS. 1 to 5 are heated so that at least the inwardly protruding portions or ribs 9 or 3 respectively have a temperature which is above the melting point of the thermoplastic material of a foamed plastic material panel 1 with sufficient excess of heat that when the metal members are urged against the panel 1 they penetrate to a greater or lesser depth into the panel 1 by the application of pressure and are thus welded with the foamed plastic material at the contact positions. The portions of the metal members 2 or 9 respectively which are to be welded into the foamed plastic material are conveniently heated to such an extent that when the desired penetration depth is reached the heat has been dissipated from the metal member or the metal member has a temperature below the melting point of the foamed plastic material. Pressure is maintained on the said portions of the metal members until the aforementioned portions are cooled, this normally requiring 5 to 10 seconds, although the cooling process may be accelerated by cooling said portions with cold air, so that the bond between the surface of the metal member 2 or 9 respectively and the melted foamed plastic material is not separated by the resilient action of the foamed plastic material. The shape and thickness of the material of the sheet metal members 2 or 9 respectively which are used as reinforcement, are selected so that sufficiently accurate and rapid heat dissipation is ensured during the welding process or so that such heat dissipation can be controlled to prevent any heat build up that may cause fusion of the foamed plastic material without bonding the same.

Figure 2:
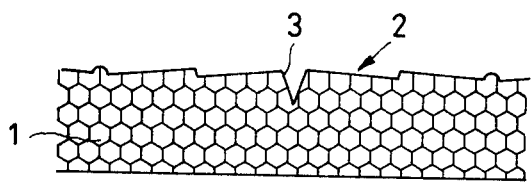
FIG. 2 is a corresponding cross-sectional view of a further embodiment of the invention.

FIG. 1 illustrates the manner in which a structural panel in accordance with the invention may be formed in which a sheet metal member 2 having at least one inwardly directed rib 3 and functioning as a reinforcing member and being formed from conventional expanded metal is welded onto a panel 1 of foamed plastic material. The ribs 3 only have a slight penetration depth and thus the adjoining herringbone sectioned zones 5 of the metal member 2 are located above the surface of the foamed plastic material panel 1. The penetration depth of the ribs 3 of the expanded metal member 2 in FIG. 2 is greater so that the herringbone sectioned zones 5 bear on the surface of the foamed plastic material panel 1. The penetration depth of the ribs 3 in FIG. 5 is even greater, and the entire expanded metal member 2 is fused into the surface of the foamed plastic material panel 1. To this end the supply of heat to the sheet metal member 2 is controlled in such a way that the herringbone sectioned zones 5 and beads or ridges 4 fuse into the surface of the foamed plastic material panel 1 and form an adhesive bond therewith.

Figure 4:
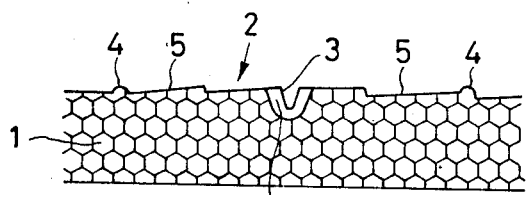
FIG. 4 is a cross-sectional view corresponding to FIG. 1 and 2 and illustrating another embodiment of the invention.
Figure 5:
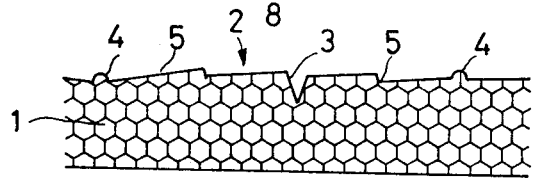
FIG. 5 is a similar view also showing another embodiment of the invention.
Figure 6:
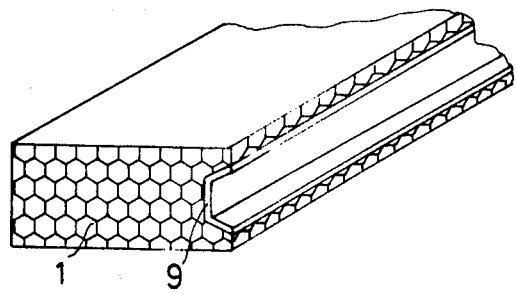
FIG. 6 is a perspective view of part of a further embodiment of a structural element according to the invention.

By contrast to FIG. 5 the heat supplied to the metal member 2 when forming the embodiment of the invention illustrated in FIG. 4 is controlled in such a way that a groove 8 is formed by melting the foamed plastics material around the rib 3 which is thus freely suspended in the said groove 8 and had a free space which enables fastening elements or the like to obtain convenient access to the rib 3.

Figure 3:
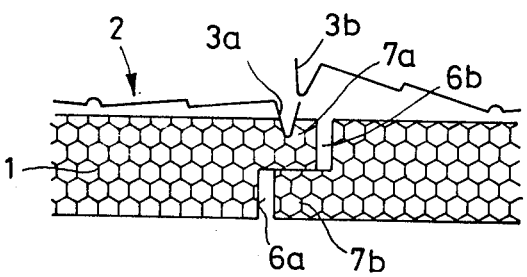
FIG. 3 is a further cross-sectional view showing the edge zones of two adjacent structural elements illustrating the method by which they are joined.

FIG. 3 shows the construction of a lap joint between two adjacent structural elements in accordance with the invention. The left-hand structural element, shown only partially, is provided with a foamed plastic material panel 1 that has a stepped flange 7a which is adapted to extend beyond a recessed portion 6a. On the other edge (not shown) the left-hand structural element is provided with a complementary arrangement of a stepped flange and a recessed portion in the same manner as shown for the right-hand structural element illustrated in FIG. 3 whose left-hand side has a stepped flange 7b disposed on the bottom the flange 7b extending beyond a recessed portion 6b. In the left-hand structural element the expanded metal sheet member 2 is arranged so that one rib 3a is welded to the panel 1 approximately at the level of the middle of the stepped flange 7a on the surface of the panel 1 which is remote from the recessed portion 6a while on the oppositely disposed edge of the right-hand structural element another rib 3b of the expanded metal sheet member 2 is located approximately at the middle of the recessed portion 6b as shown for the right-hand structural element according to the invention in FIG. 3. The portion of the expanded metal sheet member 2 adjacent the rib 3b may be bent upwardly and the two structural elements may be overlapped as illustrated in FIG. 3, the two stepped flanges 7a and 7b contacting each other and locking being subsequently achieved by virtue of the rib 3b being urged into the rib 3a which is adapted to receive said rib 3b. Thus structural elements in accordance with the invention may be adequately joined, providing evident installation advantages.

The sheet metal member 9 illustrated in FIG. 6 may be provided with locking elements in the form of snap hooks or eyelets or the like (not shown) or a clamping joint formed from similar connecting elements which are located on the endface of the structural element disposed opposite to the groove formed by the sheet metal member 9 such connecting elements being inserted into the groove formed by the sheet metal member 9 in the manner of a tongue and groove connection.

The embodiment illustrated in FIG. 6 is particularly suited for use in forming suspended ceilings, the retaining or supporting elements engaging the adjacent panels through the trough or groove of the sheet metal member 9 which forms the reinforcing insert.

A device for the production of a structural element in accordance with the invention may continuously weld a foamed plastic material panel 1 and a reinforcing member 2 or 9 respectively, there being a heating zone followed by a pressure zone which may be provided with cylindrical rollers or rollers adapted to the section of the reinforcing ribs or with roller chains that have sectional links. The heating zone may be provided with gas burning nozzles, electrically heated heating elements or any other suitable heating means. However, the welding process may also be performed intermittently in a timed method in which a reinforcing member is wholly or partially heated, for example by means of a transformer-controlled electric resistance heating, the heated surface of the reinforcing member subsequently being urged into contact with, and welded to the foamed plastic material panel by means of a hydraulically, pneumatically or mechanically actuated ram.

In utilizing a structural element in accordance with the invention plaster may be keyed to exposed portions of the reinforcing member 2.

It is to be understood that while the invention has been described with reference to embodiments in which a metal reinforcing member is disposed on only one side of the panel, two metal reinforcing members as herein described may be located on opposite surfaces of the panel. The ribs of the two metal members may be parallel and offset relative to each other or may be disposed opposite each other, or may extend transversely of each other.

Embodiments of the invention may constitute a self-supporting insulation surface cladding panel, or may be adapted to be used as shuttering for concrete.

Although the present invention has been described in some detail by way of illustration and example for purposes of clarity of understanding, it will, of course, be understood that various changes and modifications may be made in the form, details, and arrangements of the parts without departing from the scope of the invention as set forth in the claims.

I claim:

1. An insulating structural or building element comprising a sheet or panel of thermo-plastic foamed material and a first metal sheet or plate provided with at least an outer surface roughness comprising a plurality of perforations, and having at least one rib, as a stiffening insert and carrier base, and having inner and outer surfaces, the inner surface being welded to said sheet of plastic foamed material by heating at least said rib of said plate beyond the melting point of the plastic foam and pressing at least said heated portion of said plate into the plastic foam, thereby fusing or welding same together; and the outer surface of said plate including said perforations adapted to provide adhesion for plaster, mortar or the like applied thereto.

2. The structural element according to claim 1, wherein the surface roughness of said plate is formed by a ribbed expanded metal sheet with herringbone sectioned zones between the ribs, and said ribs are welded to a depth sufficient to leave the herringbone zones in a predetermined distance above the surface of the plastic foam.

3. The structural element according to claim 2, wherein said plate includes a plurality of beads welded to the plastic foam with said beads arranged between the ribs.

4. The structural element according to claim 3, wherein said herringbone zones are arranged between the ribs, and said ribs of said plate are held in overhung positions in grooves fuse welded into the plastic foam by heating.

5. The structural element according to claim 1, wherein a second plate is arranged on the opposite side of said plastic foam and is provided with a plurality of ribs extending parallel to each other.

6. The structural element according to claim 5, wherein said ribs of said second plate extend transverse to the ribs of said first plate.

7. A structural or building element according to claim 1, further comprising at least one stiffening insert in the form of a sheet metal section being fused or welded into an end edge of said sheet of plastic foamed material by heating it beyond the melting point of the plastic foam and pressing it into said edge.

8. The structural element according to claim 7, wherein said sheet metal section is provided with a V-shaped cross-section.

9. The structural element according to claim 7, wherein said sheet metal section is provided with a U-shaped cross-section.

10. The structural element according to claim 7, wherein said sheet metal section is provided with a trapezoidal shaped cross-section.

11. The structural element according to claim 7, wherein said sheet metal section forms a mating half of co-operatively associated tongue and groove elements.

12. The structural element according to claim 1, wherein said rib is designed as an anchoring element for another rib of an adjacent co-operatively associated structural element.

13. The structural element according to claim 12, wherein adjacent edges of the sheets of plastic foam are provided with stepped flanges arranged complementary to each other.

14. The structural element according to claim 1, wherein a second plate is arranged on the opposite side of said plastic foam and is provided with a plurality of ribs staggered relative to each other.

15. The structural element according to claim 1, wherein said plate is heated over its entire surface and welded substantially over its entire surface into said plastic foam.

* * * * *